UNITED STATES PATENT OFFICE.

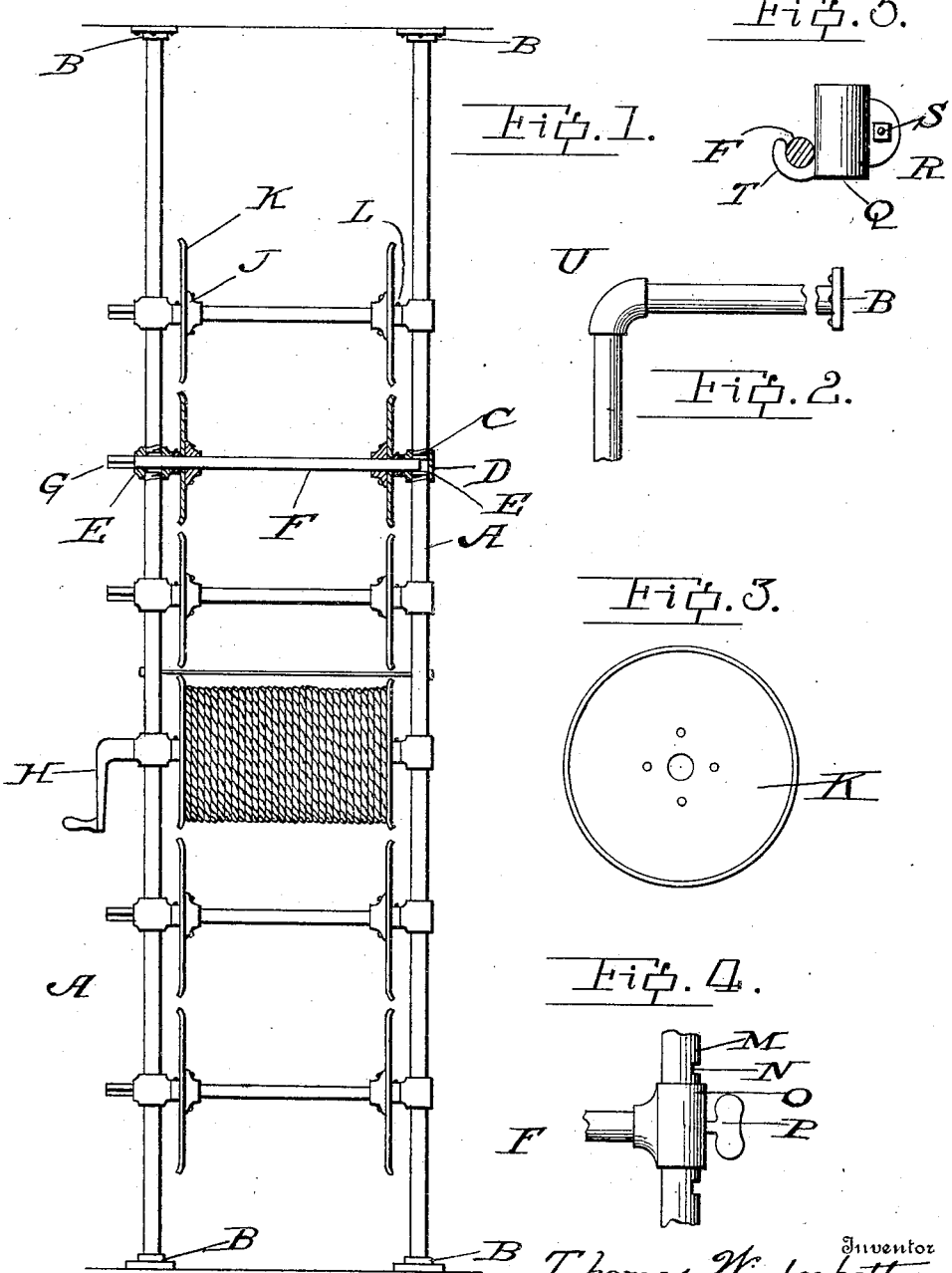

THOMAS WINTERBOTTOM, OF WHITE CLOUD, KANSAS.

ROPE-RACK.

No. 813,760.

Specification of Letters Patent.

Patented Feb. 27, 1906.

Application filed March 9, 1905. Serial No. 249,318.

*To all whom it may concern:*

Be it known that I, THOMAS WINTERBOTTOM, a citizen of the United States, residing at White Cloud, in the county of Doniphan and State of Kansas, have invented certain new and useful Improvements in Rope-Racks, of which the following is a specification.

My invention relates to improvements in rope-racks, and refers particularly to a rack for receiving rope of various sizes and permitting the easy and ready unwinding of the rope in the desired quantity in the retailing of the rope.

The main object of my invention is the provision of a rack which can be placed in a most convenient position and which will permit of instant access to the rope of any desired size, and thus save time, labor, and expense in the handling of the rope and also save space and storage room, and thus overcome objections at present found in the handling of rope.

Another object of my invention is the provision of a rope-rack which will be of extremely simple, durable, and inexpensive construction, which will have provision for rope of various sizes, which will have means for adjusting the rope-reels, and which will be entirely practical in every particular.

With these objects in view my invention consists of a rope-rack embodying novel features of construction and combination of parts, substantially as disclosed herein.

Figure 1 represents a front elevation of my complete rope-rack, partly in section to illustrate the manner of mounting the reels. Fig. 2 represents a detail view of an elbow connection which may be used, if desired. Fig. 3 represents an end elevation of one of the heads of the reel. Figs. 4 and 5 represent detail views of modified forms of adjustable reel-shaft mounting.

In the drawings, the letter A designates a pair of standards securely anchored by means of caps or sleeves B, and these standards are preferably made of tubing or pipe in a series of sections threaded at their ends, as at C, to receive the couplings D. These couplings form bearings E for the reel-shafts F, and one of the couplings, or rather the series of couplings, on one side form closed bearings, and the series of couplings on the other side form open bearings through which the extended ends of the reel-shafts extend, said ends being made angular or threaded to receive the crank H, the purpose of which is to wind the rope on the reel.

Mounted upon the reel-shafts are the series of hubs J, which are formed on one side with shoulders which abut against the bearings and to which are secured the flanges or heads K, the whole forming a reel or drum, the hubs being made rigid with the reel-shaft by means of set-screws L in order that the shaft and flanges or heads will turn bodily.

The reels are of various sizes to receive ropes of varying sizes; but, if desired, a uniform size of reel could be used, and the couplings could be made adjustable by means of the construction shown in Fig. 4, in which I employ a standard M, formed with kerfs or notches N, and a sleeve O, having a thumb-screw P engaging the notches to secure the reel-shaft at any desired adjustment upon the standard, or I may use the construction shown in Fig. 5, which consists of a split sleeve Q, having the ears R provided with a clamping-screw S for securing the sleeve on the standard, and the sleeve is formed with a trough or boxing T to receive the reel-shafts F, as will be readily understood.

In Fig. 2 is shown a form of elbow connection U for attaching the standard to a counter or other place where an elbow would be desired.

From the foregoing description, taken in connection with the drawings, the operation of my rope-rack will be readily understood, and I would simply state that the rope of various sizes is mounted upon the reels, and when desired to sell the rope it is only necessary to grasp the end of the rope of the desired size and run out the amount of rope desired, thus facilitating the handling of the rope and saving a vast amount of space, as well as much time and expense. When it is desired to wind the rope on the reels, it is only necessary to affix the crank on the extended end of the reel-shaft and wind the rope thereon.

I claim—

1. A rope-rack consisting of vertical standards composed of tubular sections having threaded ends, couplings secured to said threaded ends, said couplings formed with journal-bearings, shafts mounted in said bearings, said shafts carrying reels to hold the rope and means for turning said shafts.

2. A rope-rack consisting of standards composed of tubular sections having threaded ends, couplings secured on said threaded ends, said couplings formed with bearings, shafts mounted in said bearings, and reels mounted on the shafts.

In testimony whereof I affix my signature in presence of two witnesses.

THOMAS WINTERBOTTOM.

Witnesses:
M. S. MAUCK,
CHAS. E. EBERSOL.